(12) United States Patent
Greaves

(10) Patent No.: US 7,379,787 B2
(45) Date of Patent: May 27, 2008

(54) METHOD FOR FORMING A TANGIBLE ITEM AND A TANGIBLE ITEM FORMED BY THE METHOD

(75) Inventor: Thomas Nelson Greaves, Rochester Hills, MI (US)

(73) Assignee: FloodCooling Technologies, LLC, Bloomfield Hills, MI (US)

( * ) Notice: Subject to any disclaimer, the term of this patent is extended or adjusted under 35 U.S.C. 154(b) by 445 days.

(21) Appl. No.: 11/101,874

(22) Filed: Apr. 9, 2005

(65) Prior Publication Data

US 2006/0229754 A1  Oct. 12, 2006

(51) Int. Cl.
*G06F 19/00* (2006.01)

(52) U.S. Cl. .......................... 700/200; 700/98; 29/514

(58) Field of Classification Search .................. 700/95, 700/98, 200, 206; 29/514, 458, 505; 403/381
See application file for complete search history.

(56) References Cited

U.S. PATENT DOCUMENTS

| | | |
|---|---|---|
| 1,539,887 A | 6/1925 | VanderGrift |
| 3,416,766 A | 12/1968 | Miller |
| 4,141,531 A | 2/1979 | Strausfeld |
| 4,474,722 A | 10/1984 | Martin |
| 4,702,969 A | 10/1987 | Bunkoczy et al. |
| 4,746,055 A | 5/1988 | Ingram et al. |
| 4,810,591 A | 3/1989 | Sakai |
| 4,867,412 A | 9/1989 | Greune |
| 4,946,552 A | 8/1990 | Onnie |
| 4,997,602 A | 3/1991 | Trimble |
| 5,031,483 A | 7/1991 | Weaver |
| 5,032,469 A | 7/1991 | Merz et al. |
| 5,079,102 A | 1/1992 | Tanaka et al. |
| 5,106,290 A | 4/1992 | Carver et al. |
| 5,151,167 A | 9/1992 | Truong et al. |
| 5,156,322 A | 10/1992 | Do-Thoi et al. |
| 5,247,861 A | 9/1993 | Jahn |
| 5,256,496 A | 10/1993 | Kluczynski |
| 5,273,803 A | 12/1993 | Metcalf |
| 5,330,343 A | 7/1994 | Berteau |
| 5,345,052 A | 9/1994 | Puddephatt |
| 5,347,423 A | 9/1994 | deNeuf et al. |
| 5,377,116 A | 12/1994 | Wayne et al. |
| 5,399,239 A | 3/1995 | Pai et al. |

(Continued)

FOREIGN PATENT DOCUMENTS

DE        37 11 470 A1     4/1987

(Continued)

OTHER PUBLICATIONS

Walczyk et al., Laboratory for Manufacturing and Productivity, Massachusetts Institute of Technology, Sep. 20, 1993, 15 pages.

*Primary Examiner*—Kidest Bahta
(74) *Attorney, Agent, or Firm*—Brooks Kushman P.C.

(57) ABSTRACT

A method and a tangible item 10 which is produced by the use of various softly created sectional members, such as members 12, 14, 16, which are selectively and softly and selectively moved or rotated, in whole or in part, used to create physical sectionals, and then the physical sections are moved or rotated and use to selectively construct the physical item 10.

3 Claims, 2 Drawing Sheets

U.S. PATENT DOCUMENTS

| | | | |
|---|---|---|---|
| 5,400,946 A | 3/1995 | Weise et al. | |
| 5,421,544 A | 6/1995 | Roop | |
| 5,439,622 A | 8/1995 | Pennisi et al. | |
| 5,462,263 A | 10/1995 | Feltrin | |
| 5,529,805 A | 6/1996 | Iacovangelo et al. | |
| 5,641,448 A | 6/1997 | Yeung et al. | |
| 5,758,398 A * | 6/1998 | Rijnbeek et al. | 29/25.42 |
| 5,779,833 A | 7/1998 | Cawley et al. | |
| 5,792,492 A | 8/1998 | Takahashi | |
| 5,793,015 A | 8/1998 | Walczyk | |
| 5,830,585 A | 11/1998 | Hosoe et al. | |
| 5,847,958 A | 12/1998 | Shaikh et al. | |
| 5,869,353 A | 2/1999 | Levy et al. | |
| 5,878,619 A | 3/1999 | Walczak | |
| 5,948,548 A | 9/1999 | Welty et al. | |
| 6,021,358 A * | 2/2000 | Sachs | 700/98 |
| 6,024,851 A | 2/2000 | Radhakrishnan | |
| 6,025,036 A | 2/2000 | McGill et al. | |
| 6,038,525 A | 3/2000 | Maguire et al. | |
| 6,060,392 A | 5/2000 | Essaian et al. | |
| 6,063,436 A | 5/2000 | Pavell et al. | |
| 6,081,328 A | 6/2000 | Eng | |
| 6,090,207 A | 7/2000 | Knauss et al. | |
| 6,090,507 A | 7/2000 | Grenon et al. | |
| 6,103,402 A | 8/2000 | Marcin, Jr. et al. | |
| 6,109,332 A | 8/2000 | Sachs et al. | |
| 6,113,752 A | 9/2000 | Hollstein | |
| 6,119,407 A * | 9/2000 | Staser et al. | 49/502 |
| H1933 H | 1/2001 | Zabinski et al. | |
| 6,355,331 B2 | 3/2002 | Hillier | |
| 6,391,473 B2 | 5/2002 | Numakura et al. | |
| 6,401,001 B1 | 6/2002 | Jang et al. | |
| 6,472,029 B1 | 10/2002 | Skszek | |
| 6,495,272 B1 | 12/2002 | Creber et al. | |
| 6,587,742 B2 * | 7/2003 | Manuel et al. | 700/98 |
| 6,627,835 B1 | 9/2003 | Chung et al. | |
| 2002/0175265 A1 | 11/2002 | Bak et al. | |
| 2004/0051027 A1* | 3/2004 | Manuel | 249/117 |
| 2004/0128016 A1 | 7/2004 | Stewart | |

FOREIGN PATENT DOCUMENTS

| | | |
|---|---|---|
| EP | 0 775 550 A1 | 5/1997 |
| EP | XP-000803370 | 11/1998 |
| EP | 1 216 806 A2 | 6/2002 |
| EP | 01 130 484.7-2307 | 8/2004 |
| GB | 1 425 626 | 8/1973 |
| JP | 58-091123 | 8/1984 |
| WO | WO8707538 | 12/1987 |
| WO | WO 88/07932 | 10/1988 |
| WO | WO 95/08416 | 3/1995 |
| WO | WO 01/70450 A1 | 9/2001 |
| WO | WO 03/043795 A1 | 5/2003 |

* cited by examiner

METHOD FOR FORMING A TANGIBLE ITEM AND A TANGIBLE ITEM FORMED BY THE METHOD

FIELD OF THE INVENTION

The present invention generally relates to a method for forming a tangible item and to a tangible item which is formed by a new and novel method and, more particularly, to a mold or a tool which may be formed by the use of a soft model having a certain portion which is selectively and softly rotated and then used to selectively create tangible sections which are selectively and respectively rotated and then used to cooperatively produce the mold or tool.

BACKGROUND OF THE INVENTION

A mold or a tool is generally use d to produce a tangible item, such as a portion of a vehicle. Conventionally, a mold or tool has been produced by the use of a substantially solid block of material which is machined or "worked" to form the mold or tool. While this conventional procedure does produce an item having desirable features, it is inefficient and relatively costly.

One strategy to overcome these deficiencies involves the creation and use of a "soft" model of the desired tangible item to be created. Particularly, a soft model of the mold or tool is selectively created within Autocad® or some other type of computer aided design software, thereby allowing an intangible model of the mold or tool to be created. Intangible or soft portions or sections are formed from the software model and each of these intangible sections them become physically or tangibly manifested in respective sections or sectional members which are then typically and selectively joined together to cooperatively form the desired mold or tool. This approach is described, by way of example and without limitation, within U.S. Pat. No. 6,587,742 ("the '742 Patent"), which is owned by Applicants' assignee, and which is fully and completely incorporated herein by reference, word for word and paragraph for paragraph.

While the foregoing strategy does overcome the noted deficiencies of prior or conventional tangible entity creation methodologies, it may, due to certain tolerance variances associated with the material used to physically produce the sections and/or due to the actual construction and/or joining strategy, produce a tangible item having undesirable spatial features or qualities (e.g., the produced tangible item may lean or tilt or otherwise be spatially with the item which is desired to be produced) due to additive tolerance variances of each of the cooperatively joined sectional members (e.g., respective structural variances of each physically produced sectional members with the respective and corresponding softly modelled sectional members).

There is therefore a need for a new and improved method for producing a tangible item, such as a tool or a mold, which overcomes substantially all of the foregoing deficiencies and drawbacks of each of the various strategies and techniques. The present invention provides these and other benefits and represents a new and novel method for efficiently and accurately producing a mold or tool.

SUMMARY OF THE INVENTION

It is a first non-limiting object of the present invention to provide a method for producing a tangible item which over comes some or all of the previously delineated drawback of prior tangible item creation methodologies.

It is a second non-limiting object of the present invention to provide a tangible item which is selectively produced by the use of a methodology which overcomes some or all of the previously delineated drawbacks of prior tangible item creation methodologies.

It is a third non-limiting object of the present invention to provide a methodology for producing a tangible item having desirable spatial and geometric features.

According to a first non-limiting aspect of the present invention, a method for forming a tangible item is provided. Particularly, the method includes the steps of softly modeling the tangible item; rotatably altering only a portion of the soft model; using the rotatably altered portion of the soft model to create a first tangible entity; using the remainder of the soft model to create a second tangible entity; and coupling the first tangible entity to the second tangible entity, thereby creating the tangible item.

According to a second non-limiting aspect of the present invention, a method for forming a tangible entity is provided. Particularly, the method comprises the steps creating a soft model of the tangible entity; creating a first soft sectional member from the soft model; creating a second soft sectional member from the soft model; physically forming the first sectional member from a tangible medium; rotating the second soft sectional member by a certain amount; physically forming the second sectional member from the tangible medium; rotating the physically formed second sectional member by a second certain amount; and attaching the rotated formed second sectional member to the physically formed first sectional member, thereby forming the tangible entity.

According to a third non-limiting aspect of the present invention, a tangible item is provided and is created by the process of initially forming a soft model of the tangible item; forming a first soft sectional member from the soft model; forming a second soft sectional member from the soft model; softly rotating the second soft sectional member; creating a physical manifestation of the first soft sectional member by use of the soft model; creating a physical manifestation of the softly rotated second soft sectional member by use of the model; rotating the physical manifestation of the second soft sectional member; and attaching the physical manifestation of the second soft sectional member to the physical manifestation of the first soft sectional member, thereby forming the tangible item.

These and other features, aspects, and advantages of the present invention will become apparent from a reading of the following detailed description of the preferred embodiment of the invention, including but not limited to the subjoined claims, and by reference to the following drawings.

DETAILED DESCRIPTION OF THE PREFERRED EMBODIMENT OF THE INVENTION

Figure 1:
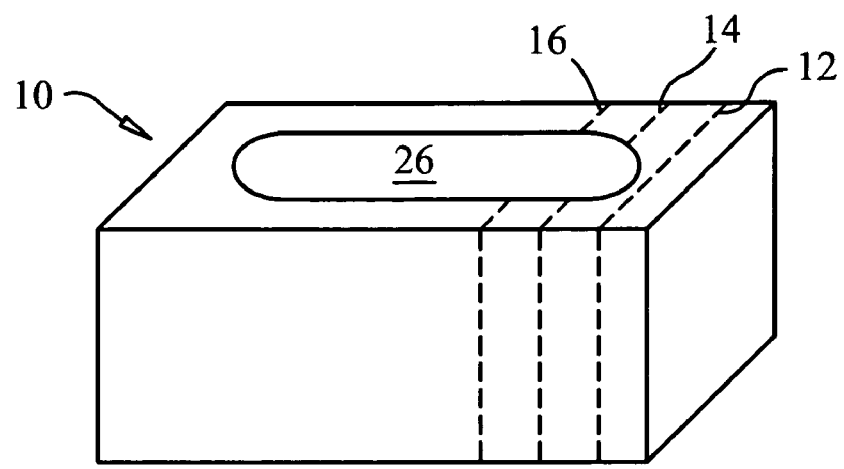
FIG. 1 is a diagrammatic representation of an intangible model of a mold or tool which is made in accordance with the teachings of the preferred embodiment of the invention.

Referring now to FIG. 1, there is shown a soft or intangible model 10 of a tangible entity to be selectively created, such as a mold or a tool. It should be appreciated that the terms "mold" or "tool" are used to generally refer to any object forming apparatus and that there terms are used interchangeably and are to be construed in the broadest possible manner. Nothing in this description should and does limit the various present inventions to a particular type of mold or tool or to a particular type of item to be produced. For example, the soft model 10 may correspond to substantially any desired tangible item. By way of example and without limitation, the model 10 may be created and operatively reside within certain computer aided design type software, such as Autocad®. The software may be operatively created and may operatively reside within a model creator and processor, such as the model creator and processor 12 of The '742 Patent. Moreover, the '742 patent describes the computer system within which the intangible model operatively resides.

Within the selectively created model 10, various sectional members or partitions, such as sectional members or partitions 12, 14, 16, may be softly or intangibly formed or created. That is, the term "softly", in this description, means that the selectively created sections or partitions, such as sections, or partitions 12, 14, 16, are selectively defined within software which operatively resides within a model creator and processor, such as entity 12 of The '742 Patent.

Figure 2:
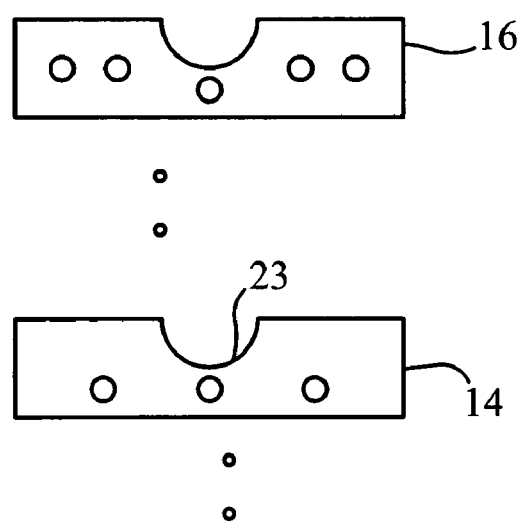
FIG. 2 is a diagrammatic representation of some of the intangible or softly created sectional members which are formed and operatively reside within the intangible model which is shown in FIG. 1.
Figure 2:
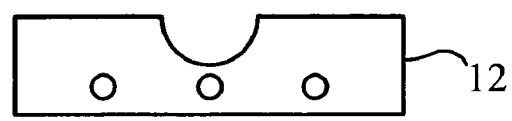

Referring now to FIG. 2, each of the softly created sectional members or partitions, such as sections or partitions 12, 14, 16, may be selectively created within the model creator and processor, such as entity 12 of The '742 Patent, and these softly created sectional members or partitions, such as sections or partitions 12, 14, 16, are formed with certain spatial geometric features and in a certain desired orientation such that when they are respectively and physically manifested and then subsequently and physically joined together in accordance with their respective position within the model 10, they cooperatively form a physical manifestation of the model 10 of the tangible item which is to be created.

That is, the physically produced or manifested item, created by the selectively coupled and physically produced sectional members, is meant to be an exact replica of the soft model 10, although the various additive tolerance variations typically prevent this desired occurrence from being achieved. For example and without limitation, each of the members 12, 14, 16 have a respective "indentation portion" 23 such that when the members 12, 14, and 16 are selectively joined they form a portion of the cavity 26 (e.g., member 12 is joined to member 14 and member 14 is joined to member 16). Similarly, each of the remaining members which are joined to the members 12, 14, 16 have a respectively similar indentation portion 23 which allows the full cavity 26 to be selectively formed when there respective physical manifestations of their various intangible sections are respectively formed and joined together, in accordance with the model 10, to desirably form a substantial replica of the item shown/described in the model 10. Thus, it should be appreciated that the members, such as members 12, 14, 16, are physically configured to cooperatively provide all of desired spatial features of the mold or tool or other tangible items to be produced.

Figure 3:
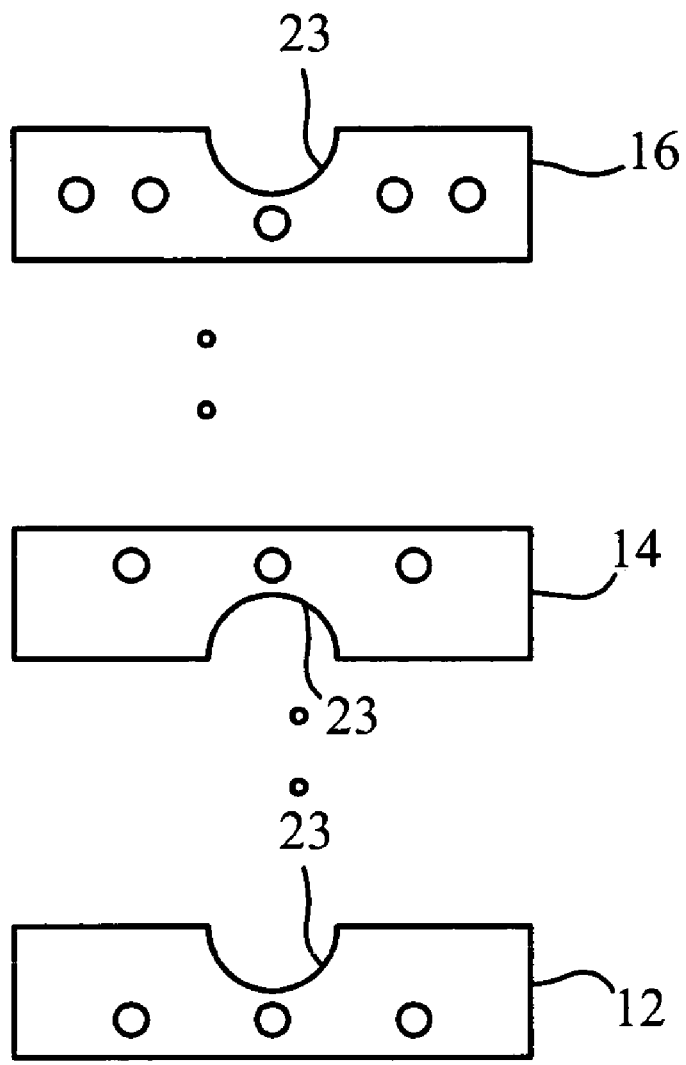
FIG. 3 is a diagrammatic representation of the intangible sectional members which are shown in FIG. 2 after some of them have been softly and intangibly rotated in accordance with the teachings of the preferred embodiment of the invention.

Referring now to FIG. 3, according to the methodology of the preferred embodiment of the invention, at least one of the softly created members 12, 14, 16 is intangibly or softly rotated (e.g., within the computer software which is operatively resident within the processor 12 of the '742 Patent ) by a certain amount, within the software model. Ideally, the rotated amount lies between zero degrees and three hundred and sixty degrees. For example and without limitation, the member 14 is moved or rotated about one hundred and eighty degrees (e.g., turned "upside down"), as is best shown in FIG. 3. In one non-limiting embodiment, every other or alternate sectional member is rotated by the same amount beginning with the rotation of member 14.

The members 12, 14, 16 which have been selectively and softly rotated, in whole or in part, are respectively used to create physical sections (e.g., are respectively made physically manifest). That is, a physical section made from a soft member, such as soft member 12, is to be an exact physical replica of that soft sectional member. For example, the soft sectional member is used to guide or operate a cutter or some other forming device which is adapted to selectively produce a replica of the soft sectional member from a sheet of steel or aluminum material or some other physical or tangible material. The physically created sectional members, respectively corresponding to previously moved or rotated soft members, are then respectively and physically moved or rotated by an amount and in a direction opposite to the movement or rotation which their respective soft members were softly moved or rotated (e.g., the physically produced sectional member 14, corresponding to member 14 of FIG. 3 is rotated or moved so it appears like member 14 of FIG. 2 with respect to or relative to member 12). After this physical movement or rotation is accomplished, the physical members appear in the same orientation with respect to the other physically created members, as their soft counterparts, and the physically created members are then joined together to form the desired mold or tool 10.

The rotation or movement of the physically created members is aided, in one embodiment, by the use of protuberances, such as those described within pending U.S. patent application Ser. No. 10/794,011, ("The '011 Application") which was filed on Mar. 5, 2004, which is owned by the assignee of the present application, and which is fully and completely incorporated herein by reference, word for word and paragraph for paragraph. Particularly, at least one protuberance, such as protuberance 16 of The '011 Application, may be placed on a first sectional member and at least one opening, such as opening 12 of the '011 Application, may be placed on a second sectional member which is to be adjacent to the first sectional member, and thus by placing the at least one protuberance 16 in the at least one opening 12, the physically created and adjourning sectional members are easily and correctly aligned. It should be appreciated that any spatial/geometric features of the physically created sectional numbers may be used for alignment (e.g., such as complementary corners), wherein the term "complementary" means a first corner fits into or is received by a second corner. Thus, the required physical movement is easily accomplished by simply overlaying one sectional member over the adjacent sectional member and placing the protuberance of one of the sectional members in the opening of the other sectional member which is adjacent to it.

It is to be understood that the invention is not limited to the exact construction and method which is illustrated above, but that various changes and modifications may be made without departing from the spirit and the scope of the inventions as are more fully delineated in the following claims. Further, it should be appreciated that by softly rotating the model residing members, such as members 12, 14, 16, and using the softly rotated members, such as members 12, 14, 16, to respectively produce tangible sections, different regions or portions of the provided sheets (e.g., referred to in column 4 of the '742 patent) may be used to construct abutting regions or portions of two adjacent members, thereby reducing and/or eliminating additive variance or tolerance error.

What is claimed is:

1. A method for forming a laminated tool from a sheet material having tolerance variances comprising:
    modeling a laminated tool using software;
    modeling a plurality of generally planar sectional members of the laminated tool to collectively provide the laminated tool;
    rotating alternating sectional members of the tool approximately 180 degrees about an axis generally parallel to the planar sectional members within the software, thereby providing a plurality of rotated sectional members and a remaining plurality of unrotated sectional members;
    using said plurality of software-modeled rotated sectional members to create a first plurality of physical sectional members from a generally planar sheet material having tolerance variances;
    using said plurality of software-modeled unrotated sectional members to create a second plurality of physical sectional members from a generally planar sheet material having tolerance variances;
    rotating said first plurality of physical sectional members approximately 180 degrees about an axis generally parallel to the planar physical sectional members, thereby reducing additive tolerance variances; and
    coupling said first plurality of physical sectional members to said second plurality of physical sectional members, thereby creating said laminated tool.

2. The method of claim 1 wherein said laminated tool further comprises a mold.

3. The method of claim 1 wherein coupling said first plurality of physical sectional members to said second plurality of physical sectional members further comprises bonding said first plurality of physical sectional members to said second plurality of physical sectional members.

* * * * *